No. 642,634. Patented Feb. 6, 1900.
C. C. SCHREIBER.
BOTTLE SOAKING AND CONVEYING DEVICE.
(Application filed June 15, 1897.)

(No Model.) 2 Sheets—Sheet 1.

Witnesses
Frank S. Blanchard
Harry R. L. White

Inventor:
Charles C. Schreiber
By Francis W. Parker,
Attorney.

THE NORRIS PETERS CO., PHOTO-LITHO., WASHINGTON, D. C.

No. 642,634. Patented Feb. 6, 1900.
C. C. SCHREIBER.
BOTTLE SOAKING AND CONVEYING DEVICE.
(Application filed June 15, 1897.)
(No Model.) 2 Sheets—Sheet 2.

Witnesses:
Frank S. Blanchard
Harry R. White

Inventor:
Charles C. Schreiber
By Francis W. Parker,
Attorney.

UNITED STATES PATENT OFFICE.

CHARLES C. SCHREIBER, OF CINCINNATI, OHIO, ASSIGNOR TO THE LINK BELT MACHINERY COMPANY, OF CHICAGO, ILLINOIS.

BOTTLE SOAKING AND CONVEYING DEVICE.

SPECIFICATION forming part of Letters Patent No. 642,634, dated February 6, 1900.

Application filed June 15, 1897. Serial No. 640,905. (No model.)

*To all whom it may concern:*

Be it known that I, CHARLES C. SCHREIBER, a citizen of the United States, residing at Cincinnati, in the county of Hamilton and State of Ohio, have invented certain Improvements in Bottle Soaking and Conveying Devices, of which the following is a specification.

My invention relates to bottle soaking and conveying devices, and has for its object to provide a new and improved device for this purpose.

My invention is illustrated in the accompanying drawings, wherein—

Figure 1:
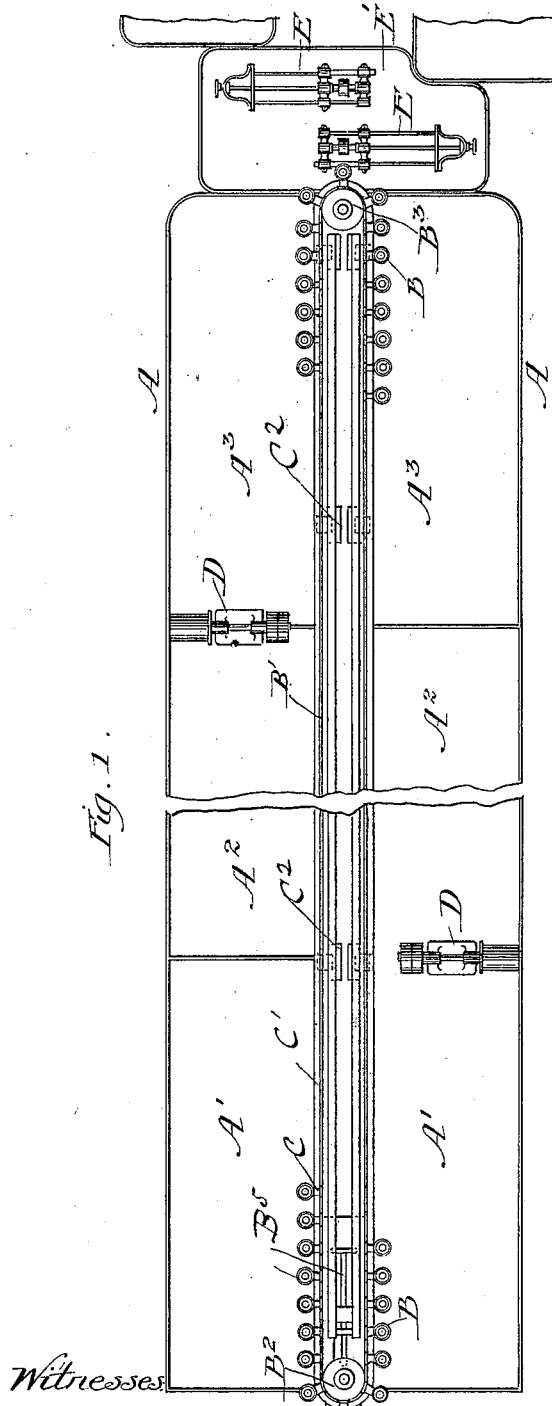
Figure 2:
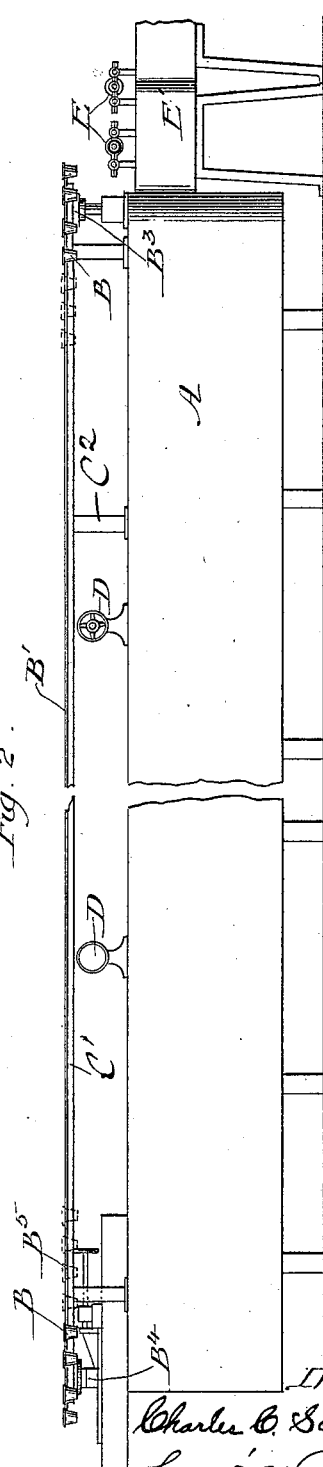
Figure 3:
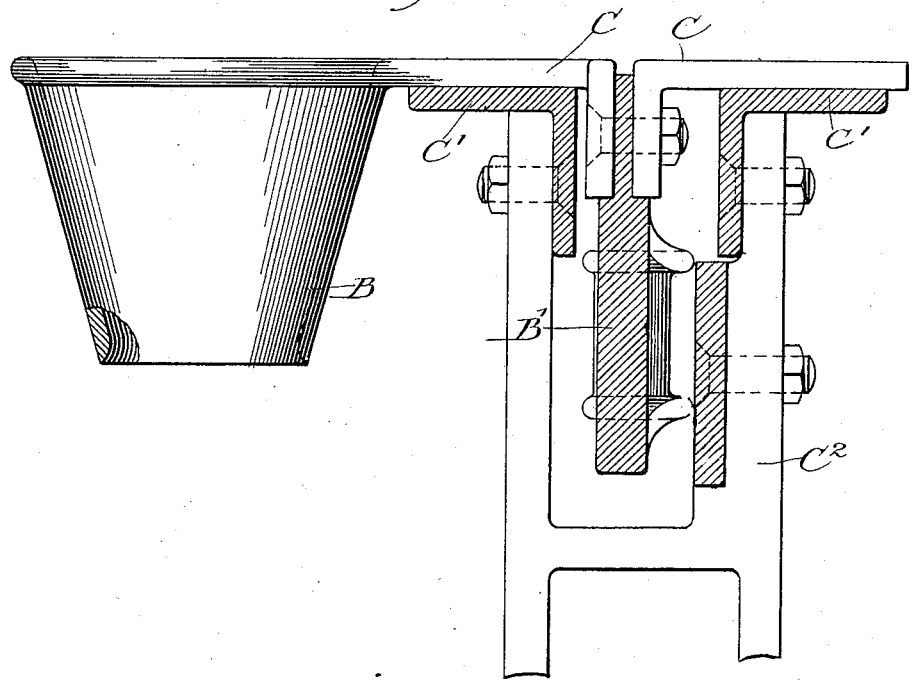
Figure 4:
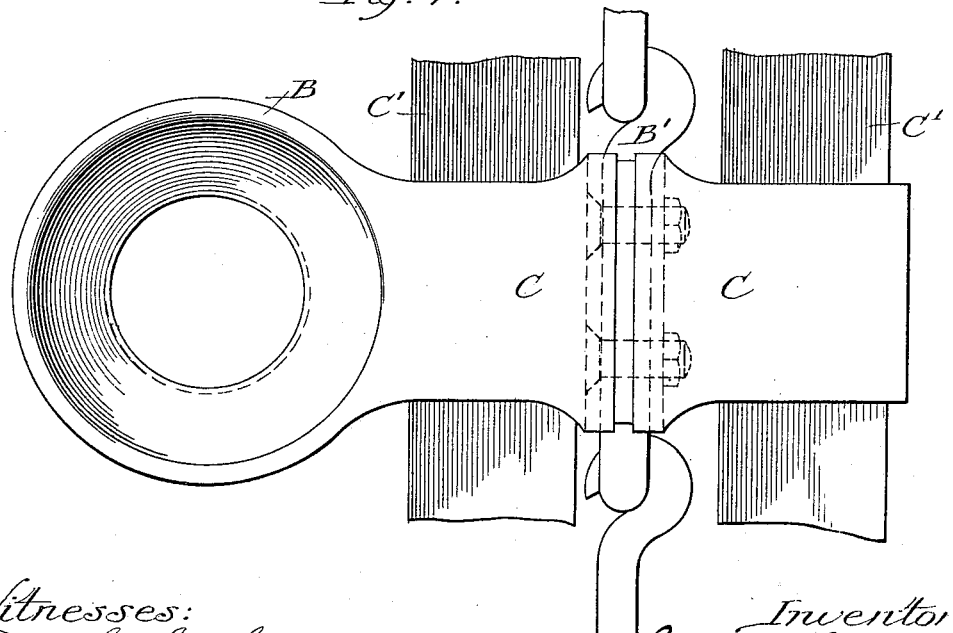

Figure 1 is a plan view, with parts omitted, of a bottle soaking and conveying device embodying my invention. Fig. 2 is a side elevation of the device shown in Fig. 1. Fig. 3 is an enlarged sectional view through one branch of the conveyer. Fig. 4 is an enlarged plan view of one of the carriers and the associated parts.

Like letters refer to like parts throughout the several figures.

Referring now to Figs. 1 and 2, the bottles or other articles to be soaked are placed in the tanks A A. These tanks are preferably provided with a series of compartments $A'$ $A^2$ $A^3$. In the drawings I have shown each tank as divided into three compartments; but it is of course evident that such tanks may be divided into any desired number of compartments. A suitable conveyer is placed above these tanks and within reach of the operators at the tanks. This conveyer may be of any suitable description, and as illustrated in the drawings consists of a series of carriers B, connected with an endless chain $B'$, passing around the sprocket-wheels $B^2$ $B^3$. A series of projecting arms C C are connected at intervals with this chain and rest upon the guides $C'$ $C'$, supported by the standards $C^2$, projecting upwardly from the tanks. The arms C on one side of the chain are connected with the carriers B. These carriers may be of any suitable construction.

The conveyer is preferably provided with some suitable adjusting device. As illustrated in the drawings, the sprocket-wheel $B^2$ is connected with a movable piece $B^4$. A screw-threaded rod $B^5$ is connected with the movable piece $B^4$, so as to move said piece when rotated and vary its position. A series of tin-foil removers D D are preferably associated with the tanks A A. One end of the conveyer is in proximity to the bottle-washers E E, mounted upon the table $E'$.

The tanks may be made of any suitable material, and I have only attempted to illustrate, diagrammatically, as it were, a construction embodying my invention in order to make its application clear. It is therefore of course evident that the parts herein shown may be greatly varied in form, construction, and arrangement without departing from the spirit of my invention, and I therefore do not wish to be limited in any manner to the construction shown and described.

The use and operation of my invention are as follows: When it is desired to use the device for soaking and cleaning bottles, the several compartments are filled with water and the bottles placed therein. When the bottles have become sufficiently soaked, the operators remove them from the soaking-tanks, rub off the labels, and place the bottles in the carriers of the conveyer. As the conveyer is in motion the bottles are carried around past the bottle-washers E E and within reach of the persons operating such bottle-washers, who remove them from the conveyer and finish the washing process. If the operators at the bottle-washers fail to remove the bottles as fast as they arrive on the conveyer, the bottles continue on their journey and can be taken off at any time thereafter. When the bottles have all been removed from the compartment $A^3$, for example, the operators move down to the compartment $A^2$ and the compartment $A^3$ is again filled. When the compartment $A^2$ is empty, the operators move down to the compartment $A'$, and the compartment $A^2$ is again filled with bottles. It will thus be seen that when the operators get around to the compartment $A^3$ the bottles therein will have had time to soak, and thus the device can be kept in continuous operation. The conveyer or link belt is set on edge, the bottle-carriers projecting laterally therefrom. The operators put the bottles into the conveyer-carriers as the latter pass by, and they have no occasion for delay in putting them in position. In like manner those who are cleaning the bottles pick up the bottle which is directly in front of them in any given case, and neither those who fill the conveyers nor those who take from the conveyers make any effort to place the bottles in position or remove them in any regular order. The conveyer travels with some little speed and always carries a number of bottles scattered about along its length unless it happens to be nearly full, and there are therefore always bottles within convenient reach of the person who is to remove and clean them and vacant carriers within convenient reach of the person whose duty it is to fill such carriers with the bottles which he has just taken from the tank.

It has heretofore been the practice to use single tanks in washing and soaking bottles, a bottle-washing machine being placed near this tank. When the tank became empty, the operation of such tank and bottle-washing machine was delayed until the tank was refilled and the bottles therein sufficiently soaked. With the apparatus herein shown this difficulty is obviated and a continuously-operated system is provided wherein there need be no delays of any kind.

I claim—

1. A device for cleaning bottles or the like, comprising a tank in which the bottles are soaked, a conveyer for said bottles located above said tank and supported thereon, said conveyer comprising an endless flexible power-transmitting device disposed in a substantially horizontal plane, a series of carriers connected therewith and adapted to receive the bottles, said carriers being formed with vertical openings so as to engage said bottles and hold them in place during all their various positions, and a driving part connected with said power-transmitting device so as to impart motion thereto.

2. A device for cleaning bottles or the like, comprising a soaking-tank divided into a series of separate compartments in which the bottles are contained, so that a series of sets of bottles may be soaked while another set is being removed from the tank, thus allowing the washing process to be continuous, and a conveyer above said tank and located between the edges thereof, said conveyer being supported by the tank.

3. A conveyer for bottles or the like, comprising an endless flexible power-transmitting device disposed in a substantially horizontal plane, a series of carriers connected therewith and adapted to receive the bottles, said carriers formed with vertical openings so as to engage said bottles and hold them in place during all their various positions, and a driving part connected with said power-transmitting device so as to impart motion thereto.

4. A conveyer for bottles, comprising an endless link belt formed into a loop and passing around suitable sprocket-wheels, a series of arms connected with said belt and engaging stationary guides and a series of carriers connected with said arms adapted to receive the bottles and hold them in position.

5. In a device for assisting in washing bottles, the combination of a link-belt conveyer placed on edge with horizontally-placed sprocket-wheels to drive the same, arms projecting from said belt provided with suitable guides and adapted to travel therewith, and bottle-carriers associated, one with each of said arms, said bottle-carriers so positioned that the mouths of the bottles are downward when in the tank.

6. In a device for assisting in washing bottles, the combination of a link-belt conveyer placed on edge with horizontally-placed sprocket-wheels to drive the same, arms projecting from said belt and adapted to travel therewith, bottle-carriers associated, one with each of said arms, and a bottle-soaking tank associated with said conveyer, acting as a support for the same.

7. In a device for assisting in washing bottles, the combination of a link-belt conveyer placed on edge with horizontally-placed sprocket-wheels to drive the same, arms projecting from said belt and adapted to travel therewith, bottle-carriers associated, one with each of said arms, a supporting device for said conveyer comprising a bottle-soaking tank associated with said conveyer, said tank divided into compartments so that the bottles can be taken from one compartment while they are being soaked in another, said conveyer supported by the tank so as to pass over all of said compartments.

CHAS. C. SCHREIBER.

Witnesses:
GEORGE B. PARKINSON,
BRAYTON G. RICHARDS.